May 17, 1955

R. A. OSWALD 2,708,616

METHOD AND APPARATUS FOR DETERMINATION
OF RACETRACK FINISH LINE AND LANES

Filed June 14, 1952

INVENTOR.
ROBERT A. OSWALD
BY
Townsend and Townsend
ATTORNEYS

May 17, 1955

R. A. OSWALD 2,708,616

METHOD AND APPARATUS FOR DETERMINATION
OF RACETRACK FINISH LINE AND LANES

Filed June 14, 1952

INVENTOR.
ROBERT A. OSWALD
BY
Townsend and Townsend
ATTORNEYS

May 17, 1955
R. A. OSWALD
2,708,616
METHOD AND APPARATUS FOR DETERMINATION
OF RACETRACK FINISH LINE AND LANES
Filed June 14, 1952
3 Sheets-Sheet 3
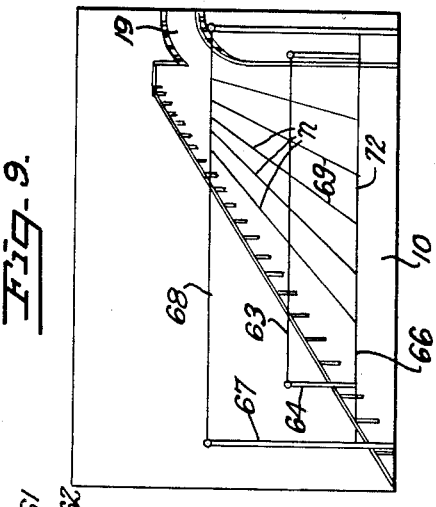
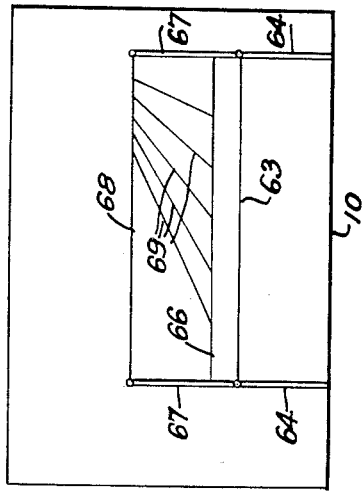
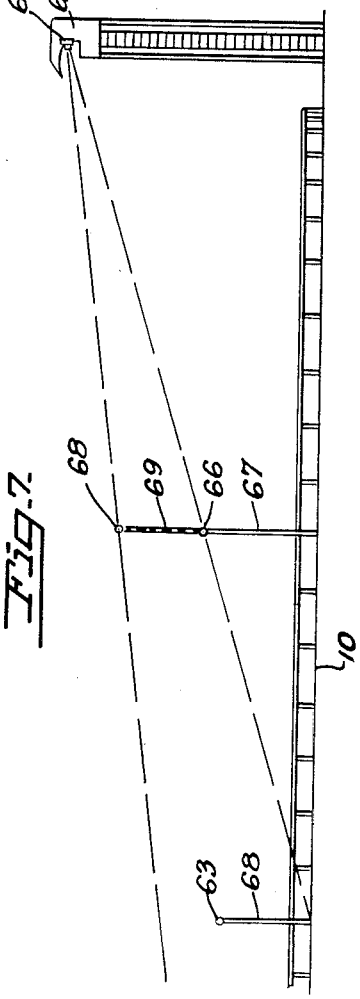
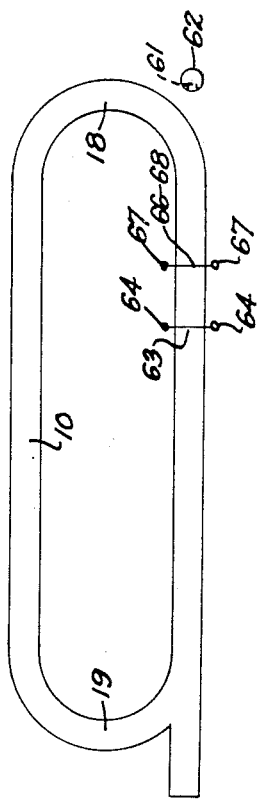
INVENTOR.
ROBERT A. OSWALD
BY
Townsend and Townsend
ATTORNEY United States Patent Office 2,708,616
Patented May 17, 1955

2,708,616

METHOD AND APPARATUS FOR DETERMINATION OF RACETRACK FINISH LINE AND LANES

Robert A. Oswald, San Mateo, Calif.

Application June 14, 1952, Serial No. 293,541

12 Claims. (Cl. 346—107)

This invention relates to new and useful improvements in the photography of racing contests. More particularly, the invention relates to the imposition of a fictitious finish line or other given line on a photograph of a race, or on each of the frames of a motion picture of a race, one purpose of which is to provide a positive indication of whether a particular foul or other infraction of racing rules occurred before or after the finish of a contest. Additionally, the invention enables the photographic determination or location of the lanes of contestants on a race course between given points and assists in determining whether a contestant has veered from a straight path.

The present invention has particular application in the art of photographing racing events by means of motion picture cameras stationed at fixed points around the track, such cameras generally being located in towers or on top of a grandstand or other elevated places. Such methods of photographing races are in common use at many thoroughbred racing courses in the United States and in other racing courses. Commonly one camera is stationed in a tower located at the end of the straightaway approximately at the beginning of a first turn in the race course beyond the finish line. By reason of the fact that the finish line is commonly about in the middle of the straightaway portion preceding the turn at which this camera in question is located, the horses are a considerable distance from the camera when they are approaching and crossing the finish line. It is accordingly extremely difficult to determine, when observing the pictures, whether or not an infraction, foul or other significant event has occurred before or after the finish line has been crossed. This is particularly true in that the finish wire which extends across the track is considerably elevated above the track surface and the angle of the camera is such that the image of the wire on the photograph by no means accurately locates the horses relative to the actual finish line.

Accurate location of a given horse relative to the finish line at the time of commission of a foul or infraction is important for several reasons. In the first place, a foul which occurs before the finish of a race may disqualify a contestant and change the order of placement of winners and the payment of wagers. On the other hand, if a foul occurs after the horses have crossed the finish wire, no change in the placing of the horses is required.

Various infractions of the rules of racing are commonly detected by photography of the type hereinbefore described. One of the most serious of these infractions is the determination by the judges whether a jockey has ridden out his mount or pulled the horse up short of the finish line. Thus it is important in observing the control of the jockey over his mount to determine whether pulling up the horse occurred before or after the conclusion of the race.

Although photography of the type heretofore described is not commonly employed to determine the order in which the horses cross the finish line (such determination being made ordinarily by cameras stationed at the side of the track in line with the finish line) nevertheless the method hereinafter described may be used to determine the order of the horses crossing the finish line with unusual accuracy.

Accordingly, it is one principal purpose of the instant invention to impose upon each picture and each frame of a motion picture of the finish of a race a reference finish line which coincides with and represents a fictitious line drawn on the track surface immediately below the finish wire. This reference finish line accurately locates for the viewer the position of a horse relative to the finish line so that any significant occurrence involving the horse may be readily identified from the picture itself as having occurred before or after the crossing of the finish line.

As hereinafter more fully appears, the instant apparatus and method may be used to photograph the passage of contestants across any given line across the track such as, for example, a quarter mile. The time elapsed between passage of a first line and a second line across a track may also be determined by use of the instant means and method as hereinafter set forth. From knowledge of the distance between said first and said second line, the velocity of the contestant may also be computed.

Another feature of the invention involves the stretching of wires in a vertical plane, which will, upon being photographed by the elevated camera, impose on each picture frame a plurality of lines corresponding with imaginary lane lines extending parallel to the track. These lines on the picture assist judges viewing the film to determine whether a contestant has held to a straight course or has veered out of a straight line. Thus, the wires enable judges to determine which of two contestants is responsible for a foul involving a collision. Further, the wires establishing said imaginary lane lines enable the judges to determine how far out from the infield rail a horse was situated at the time that any given frame of the picture was exposed. The wires referred to in this paragraph stretch between two horizontal wires. The lower horizontal wire preferably may be the wire which imposes a reference finish line or other given line on the frames of the picture. It will be understood that the lane marking wires are not vertical, but on the contrary, converge toward the top, so that they correspond to the converging lines of the perspective of the camera, all as hereinafter more fully appear.

Other objects of the present invention will become apparent upon reading the following specification and referring to the accompanying drawings in which similar characters of reference represent corresponding parts in each of the several views.

Fig. 1 is a diagrammatic plan view of a race course showing the location of elevated cameras, the actual finish line and the wire establishing the reference finish line hereinafter described.

Fig. 2 is an elevation showing a portion of the track beyond the finish line up to the first turn.

Fig. 3 is a view showing a frame of a motion picture taken by a camera located in the tower shown in Fig. 2.

Fig. 6 is a diagrammatic plan view of a race course as used in a modification in this invention showing the location of an elevated camera, the actual finish line, a wire establishing a reference finish line, and additional wires marking lanes on the race course in advance of the actual finish line.

Fig. 7 is a side elevation showing a portion of a track as arranged in accordance with the modification of Fig. 6.

Fig. 8 is an end elevation showing the wire establishing the reference finish line, the wires marking the lanes on the track, and the horizontal wire positioned above the reference finish wire from which the wires establishing the lanes on the track are suspended.

Fig. 9 is a view showing a frame of a motion picture taken by camera located in accordance with Fig. 6.

Figure 5:
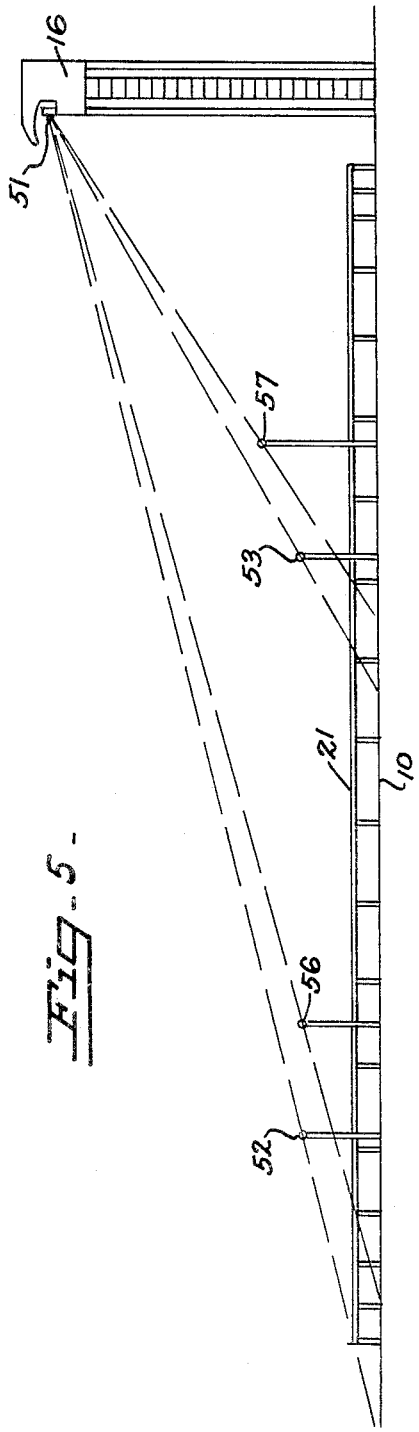
Fig. 5 is an elevation of a portion of the course shown in Fig. 4.
Figure 4:
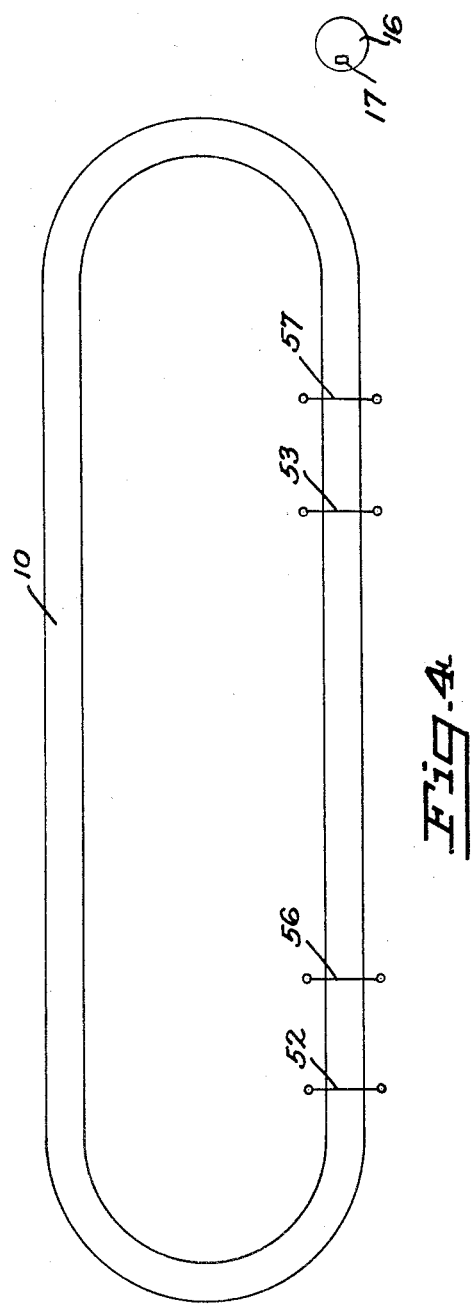
Fig. 4 is a diagrammatic plan view of a race course showing the application of the invention to the timing of races.

In Fig. 1 is shown diagrammatically a typical race course, said race course having a straightaway section 10 immediately before the grandstand, with a finish wire stationed at about the middle of said straightaway portion, said finish wire being elevated and strung between standards 12 located on opposite sides of the track. The purpose of finish wire 11 is to enable the officials visually to determine the placing of the horses.

At the present time, many race courses are equipped with elevated towers 16 disposed at strategic locations around the track in which are stationed motion picture cameras 17 which photograph all of the action taking place on the track within the range of the camera. Commonly one such tower 16a is located at the end of straightaway 10 just entering the first turn 18 beyond the finish wire. Camera 17 located in tower 16a normally photographs the action which occurs after the horses have completed the turn 19 opposite that at which camera 17 is located and while the horses are entering the straightaway 10 and crossing under finish wire 11. When camera 17 is using a lens of a long focal length, such as is commonly employed for this purpose, and when the horses are running wide of the infield rail 21, it is impossible at some times for the camera to photograph either the poles 12 from which the finish wire is strung or the posts 22 supporting infield rail 21 or any other stationary identifying object which would enable the officials viewing the picture to identify a particular infraction or suspected infraction of the rules relative to the actual finish wire 11. It will be observed particularly from Fig. 2 that a line of sight 26 passing from the center of the lens of camera 17 through the actual finish wire 11 strung above the track furnishes practically no basis for estimating the position of the actual finish line at the track surface.

Accordingly, the present invention involves the positioning of the second wire 31 elevated above the track and strung between standards 32 located between camera 17 and actual finish wire 11. The elevation and location of this second wire 31 is such that a line 33 drawn from the center of the lens of the camera through the second wire intersects the surface of the track in a fictitious reference finish line 34 immediately below the actual finish wire 11. This second wire 31 extends perpendicular to the line of sight 33 passing from the lens of camera 17 to the reference finish line 34. Thus, as shown in Fig. 3, the wire 31 appears in the picture frame as a reference finish line 34 on the track surface immediately below the actual finish line 11 and extending completely across the track. Wire 31 is elevated a sufficient height so as not to interfere in the passage of contestants.

Instead of imposing line 34 on the picture to correspond with a fictitious line located at track level and in the vertical plane which includes finish wire 11, line 34 may be imposed to correspond with a fictitious line located elevated a predetermined distance (such as the average height of the nose of a horse) above track level and in the vertical plane which includes wire 11. The last mentioned arrangement is desirable since a horse has officially crossed the finish line when his nose touches the vertical plane which includes the finish line. The imposition of line 34 on the picture is merely a matter of adjustment of the elevation of wire 31.

The term "wire" as used in connection with element 31, is intended to include other thin members performing similar functions.

When an official views the frame shown in Fig. 3 projected on a screen after the race, the reference finish line 34 which is constructed by wire 31 accurately provides a reference from which the official may determine whether or not a particular horse has crossed the finish line at the time the frame was photographed. Thus, if the particular frame shows a foul occurring and the frame also shows that the horse involved in the foul has not crossed the reference finish line 34, then the placing of the horses may be revised upon the disqualification of the horse causing the foul. On the other hand, if the frame shows that the horse has already crossed the reference finish line 34 imposed by wire 31, then no revision of the placing of the horses is required, although the jockey responsible for the foul may be subject to disciplinary action.

Further, if a particular frame projected on the screen shows that a jockey has begun to "pull" his mount and this frame further shows that the horse has not yet crossed reference finish line 34, then the jockey may be subject to disciplinary action, whereas if the frame shows the horse has already crossed line 34, no disciplinary action is required. By locating the fictitious reference finish line 34 on the frame it is also frequently possible to determine the winning horse. This is of importance where no camera is located on the side of the track opposite the finish wire 11 or where such camera for some reason fails to record the finish of the race.

It will be seen that wire 31 must be located and elevated with reference to camera 17 and wire 11 so that line 33 drawn from the center of the lens of camera 17 through any point in wire 31 intersects the surface of the track immediately below wire 11. Alternatively wire 31 may be located and elevated so that the line drawn from the center of the lens of camera 17 through any point in wire 31 intersects the vertical plane which includes wire 11 a predetermined height (such as the average height of the nose of a horse) above the level of the race course.

It will be understood that whereas it is most frequently desirable to employ the foregoing described method and apparatus in connection with the finish line of a race course, nevertheless, the apparatus and method may be used to fix upon a film a line corresponding to a given line drawn across the track at any other location along or around the track at any elevation above the level of the track. Thus the passing of a contestant through a vertical plane passing through a line across the track at the quarter mile or half mile pole and the like may be recorded on the film.

In connection with the foregoing, the invention also has particular application in the timing of races. Assuming that a motion picture camera 51 is driven at a constant speed of, for example, 24 frames per second, the number of frames of film consumed during the time interval between a contestant passing a first arbitrary line 52, such as the start of the race, and a second arbitrary line 53, such as the finish line, or some other given line of the course, may be computed within an accuracy of $\frac{1}{24}$ second. The number of frames is determined by observing on the film the crossing of a first line imposed on a first frame of the film by a first wire 56 located to correspond with a first imaginary line 52 across the track at a first location and a second line imposed on a second frame of the film by a second wire 57 located to correspond with a second imaginary line 53 across the track at a second location and counting the frames between said first and second frames. Of course, this may be simplified by measuring the lineal feet between the two frames and multiplying by the number of frames per foot. The crossing of, for example, the first line 52 may be recorded on the film by other means, as a flashing light synchronized with opening the starting gate.

Speed of travel may be computed by dividing the known distance between the two lines 52 and 53 by the elapsed time.

As shown particularly in Figs. 6 to 9, inclusive, the invention may be modified to impose upon each frame of a motion picture a plurality of lines corresponding in perspective to imaginary lane lines drawn longitudinally of a straight stretch of a race course such as the straight stretch in advance of the finish line. When a foul such as bumping occurs, the imaginary lane lines assist the judges in determining which of two contestants was responsible. It is sometimes otherwise difficult from the pictures to perceive which of two contestants was pursuing a straight course and which was veering toward or away from the rail.

A camera 61 is located in tower 62 elevated above the surface of track 10. In Figs. 6 to 9 inclusive, wire 63 elevated on poles 64 indicates the actual finish wire. Wire 66 elevated on poles 67 projects on the film the imaginary or reference finish line, said wire 66 being elevated and positioned relative to wire 63 and camera 61 so that all lines drawn from camera 61 through wire 66 when projected intersect the level of track 10 immediately below actual finish wire 63. Thus, in effect, wire 66 corresponds to wire 31 in Figs. 1 to 3 inclusive. Poles 67 extend higher than wire 66 and at the top of said poles 67 a horizontal wire 68 is strung across the track. A plurality of wires 69 is strung in the vertical plane including wires 66 and 68. Said wires are not vertical, but on the contrary, converge toward the top in such fashion that the lines 71 imposed by said wires 69 on the frame of the picture shown in Fig. 9 correspond to imaginary lane marking lines drawn on the surface of track 10, parallel to the infield rail. It will be understood that the picture of Fig. 9 is in perspective and said lines 71 converge in the same perspective relation as the rails of the track. It will further be seen that an imaginary line 72 is imposed on the frame shown in Fig. 9 by wire 66 in the same manner that line 34 is imposed in Fig. 3. Thus, the picture of Fig. 9 performs all of the same functions as those of Fig. 3, but in addition, the lines 71 establish imaginary lanes on the track which assist the judges viewing the picture in deciding whether or not a given contestant pursued a straight course parallel to the infield rail or veered away therefrom. These imaginary lines extend back from the actual finish line 11 to approximately the turn 19 ahead of the actual finish line 11.

Although the present invention has been described in some detail by way of illustration and example for purposes of clarity and understanding, it is understood that certain changes and modifications may be made within the spirit of the invention and scope of the appended claims.

What is claimed is:

1. In combination, a race course, means establishing a vertical plane extending across the course, said plane including a given line, a camera having a lens, means elevating said camera above the level of said race course remote from said vertical plane in a direction at an angle with respect to said plane, a thin wire, and means elevating said thin wire above the level of said race course between said camera and said given line so that straight lines drawn through the center of said lens and said wire pass through the intersection of said vertical plane and the level of said course.

2. In combination, a race course, a finish wire, means elevating said finish wire above the level of said race course with said finish wire extending transversely across said track, a camera, means elevating said camera above said race course at a point remote from said finish wire in a direction at an angle to said finish wire when projected in a horizontal plane, a second wire, and means for elevating said second wire above the level of said race course between said camera and said finish wire, said second wire being elevated and positioned so that straight lines drawn from said camera through said second wire intersect the level of said race course directly under said finish wire.

3. In combination, a race course, first means elevated above the level of said race course defining an imaginary given line extending across said race course at the level of said course, second means remote from said given line in a direction at an angle with respect to said given line when projected in a horizontal plane and elevated above said course, said second means including a light-sensitive element and a lens for focusing on said light-sensitive element the image of contestants on said course adjacent said given line, and third means located at said course for imposing upon said light-sensitive element an actual line corresponding in position to said imaginary given line, said third means comprising a filament elevated above said course between said first means and said light-sensitive element.

4. In combination, a race course, first means elevated above the level of said race course defining an imaginary finish line at the level of said race course extending across said race course, second means elevated above said race course and positioned at a distance from said first means and removed from said first means in a direction substantially perpendicular to said finish line for taking a picture of contestants on said race course adjacent said finish line, a wire extending across said race course between said second means and said imaginary finish line, and third means for elevating said wire above the level of said race course, said third means being located and said wire being elevated thereby to impose upon a picture taken by said second means a line corresponding in position to said imaginary finish line.

5. In combination a race course, first means defining a vertical plane extending across said race course, a camera elevated above the level of said race course and positioned remote from said vertical plane in a direction substantially normal to said plane, a wire extending across said race course between said camera and said vertical plane, and means elevating and positioning said wire so as to impose upon the picture taken by said camera a line corresponding to an imaginary line on said vertical plane at a desired elevation with respect to said race course.

6. A method of preparing and exhibiting photographs of contestants proceeding about a race course for the purpose of judging to determine the location of said contestants relative to a given line at the time each photograph is exposed and wherein said contestants across said given line, comprising photographing the contestants approaching, crossing and continuing beyond said given line from a position above the level of said race course remote from a vertical plane including said given line and from a location ahead of said given line, projecting the photographs on a screen and simultaneously imposing upon the projected photographs an actual line corresponding to an imaginary line drawn across the so photographed portion of said race course at a desired elevation with respect to said race course in said vertical plane passing through said given line.

7. A method of photographically determining the time interval between the passage of a contestant past a first location on a race course and the passage of the contestant past a second location on said race course, which method comprises photographing at constant speed motion pictures of the contestant approaching, crossing and passing said second location from a position above the level of said race course, imposing on each photograph at the time of photographing the image of a wire extending across said race course between the point of photographing and said second location so that each photograph taken has imposed thereon a line corresponding to an imaginary line drawn across said race course at said second location at a desired elevation with respect to said course in the vertical plane across said course at said second location, imposing on one of the photographs an indicium corresponding to the passage of said contestant past said first location, continuing to photograph said second location until said contestant crosses said second location, computing the quantity of photographs which have been photographed between the passage of said first location and said second location, and computing the elapsed time from the known speed of taking of said photographs.

8. A method of computing the velocity of an object proceeding between a first line and a second line across a course a spaced distance apart, comprising photographing at constant speed a motion picture of the object approaching, crossing and passing said first line and said second line from a position above the level of said race course, imposing on each photograph at the time of photographing the images of a first wire across said race course between the point of photographing and said first line so that photographs taken have imposed thereon a first reference line corresponding to a first imaginary line drawn across said course at a desired elevation with respect to said course in a vertical plane passing through said first line, imposing on each photograph at the time of photographing the image of a second wire extending across said course between the point of photographing and said second line so that each photograph taken has imposed thereon a second reference line corresponding to a second imaginary line drawn across said course at the desired elevation with respect to said course in a vertical plane passing through said second line, and computing the velocity of said object from the elapsed time between said crossings.

9. In combination, a race course, a camera elevated above the level of said race course and including in its field of view an extended straight stretch of said race course, a first wire extending across said race course, means elevating and positioning said first wire to impose upon a picture taken by said camera a line on the straight stretch of said race course corresponding to an imaginary line on said race course at a desired location on said race course, a second wire extending across said race course between said camera and said straight stretch of said race course, means elevating and positioning said second wire, and a plurality of third wires extending in a plane between said first wire and said second wire, said third wires converging toward the top and being located so as to impose upon each frame of a picture taken by said camera a plurality of lines corresponding to imaginary lane marking lines extending along said straight stretch of said course and parallel thereto, said first, second and third wires being located remote from said desired location.

10. A method of preparing and exhibiting photographs of contestants proceeding on a straight stretch of a race course characterized by the absence of lane markers on said course for the purpose of judging said contestants and wherein said contestants cross a given line, comprising photographing said contestants traversing said straight stretch approaching and crossing said given line from a position elevated above the level of said race course remote from a vertical plane including said given line and from a location ahead of said given line, projecting the photographs on a screen and imposing upon the projected photographs the images of a plurality of actual lines corresponding to imaginary lane marking lines drawn on the photographed portion of said straight stretch of said race course.

11. In combination, a race course, a camera elevated above the level of said race course and including in its field of view an extended straight stretch of said race course and located toward one end of said straight stretch, a first wire extending across said race course, means elevating said first wire, a second wire extending across said race course between said camera and said straight stretch of said race course, means elevating and positioning said second wire, and a plurality of third wires extending in a plane between said first wire and said second wire, said third wires converging toward the top and being located so as to impose upon each frame of a picture taken by said camera a plurality of lines corresponding to imaginary lane marking lines extending along said straight stretch of said course and parallel thereto.

12. In combination, a race course, first means defining a first vertical plane extending across said race course and including a finish line, a camera elevated above the level of said race course and positioned remote from said first vertical plane and including within its field of view an extended straight stretch of track preceding said finish line, a first wire extending across said race course between said camera and said first vertical plane, a second wire extending across said race course between said camera and said first vertical plane, second means elevating and positioning said first wire so as to impose upon each picture taken by said camera a line corresponding to an imaginary line in said first vertical plane at a desired elevation with respect to said race course, said second means also elevating and positioning said second wire above said first wire, and a plurality of third wires stretching in a second vertical plane between said first wire and said second wire, said third wires converging toward the top and positioned with respect to each other and with respect to said race course and camera to impose upon each picture taken by said camera a plurality of lines corresponding to imaginary lane marking lines on said straight stretch of said race course and parallel thereto, said first, second and third wires being located remote from said first vertical plane.

References Cited in the file of this patent

UNITED STATES PATENTS

| | | |
|---|---|---|
| 516,278 | Petri | Mar. 13, 1894 |
| 1,895,211 | Short | Jan. 24, 1933 |
| 2,403,911 | Crowley | July 16, 1946 |
| 2,618,195 | Herman | Nov. 18, 1952 |
| 2,619,402 | McCutcheon | Nov. 25, 1952 |
| 2,633,054 | Black | Mar. 31, 1953 |